(12) United States Patent
Takeuchi et al.

(10) Patent No.: US 12,732,376 B2
(45) Date of Patent: Sep. 8, 2026

(54) INFORMATION PROCESSING DEVICE AND CONTROL METHOD FOR SECURELY PERFORMING INDIRECT MONITORING OF NON-SECURE REGION OF INFORMATION PROCESSING DEVICE

(71) Applicant: Panasonic Automotive Systems Co., Ltd., Kanagawa (JP)

(72) Inventors: Akihito Takeuchi, Osaka (JP); Takumaru Nagai, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 177 days.

(21) Appl. No.: 18/627,168

(22) Filed: Apr. 4, 2024

(65) Prior Publication Data

US 2024/0250825 A1 Jul. 25, 2024

Related U.S. Application Data

(63) Continuation of application No. PCT/JP2023/003978, filed on Feb. 7, 2023.

(30) Foreign Application Priority Data

Sep. 14, 2022 (JP) ................................ 2022-146517

(51) Int. Cl.
*H04L 9/32* (2006.01)

(52) U.S. Cl.
CPC .................................. *H04L 9/3236* (2013.01)

(58) Field of Classification Search
None
See application file for complete search history.

(56) References Cited

U.S. PATENT DOCUMENTS 12,045,641 B1 * 7/2024 Vaidyanathan ....... H04L 9/3236
2006/0294369 A1 12/2006 Matsushima et al.
2008/0163211 A1 7/2008 Mizuno
2013/0179330 A1 * 7/2013 Quillian ................ G06Q 40/03 705/38

(Continued)

FOREIGN PATENT DOCUMENTS

JP 2008-165410 7/2008
JP 4691337 6/2011 (2005-100378)

(Continued)

OTHER PUBLICATIONS

Office Action dated May 9, 2023 issued in Japanese Patent Application No. 2023-520072 and corresponding English machine translation.

(Continued)

*Primary Examiner* — William J. Goodchild
(74) *Attorney, Agent, or Firm* — Greenblum & Bernstein, P.L.C.

(57) ABSTRACT

An information processing device includes: a monitored unit; a first monitor unit that monitors the monitored unit, and repeatedly verifies the monitored unit by comparing a hash value of the monitored unit with a first expected hash value; and a second monitor unit that is more secure than the first monitor unit, monitors the first monitor unit, and repeatedly verifies the first monitor unit by comparing a hash value of the first monitor unit including the first expected hash value with a second expected hash value.

6 Claims, 9 Drawing Sheets

(56) References Cited

U.S. PATENT DOCUMENTS

| | | | | |
|---|---|---|---|---|
| 2013/0275980 | A1* | 10/2013 | Datta | A61F 2/30771 718/1 |
| 2014/0298026 | A1 | 10/2014 | Isozaki et al. | |
| 2015/0074384 | A1 | 3/2015 | Yajima et al. | |
| 2016/0274482 | A1* | 9/2016 | Jota | G03G 15/043 |
| 2019/0182049 | A1* | 6/2019 | Juels | H04L 9/3247 |

FOREIGN PATENT DOCUMENTS

| | | |
|---|---|---|
| JP | 2015-055898 | 3/2015 |
| JP | 6067449 (2014-191509) | 1/2017 |

OTHER PUBLICATIONS

Office Action dated Aug. 22, 2023 issued in Japanese Patent Application No. 2023-120272 and corresponding English machine translation.

International Search Report issued in International Pat. Appl. No. PCT/JP2023/003978, dated Apr. 25, 2023, along with an English translation thereof.

* cited by examiner

FIG. 1

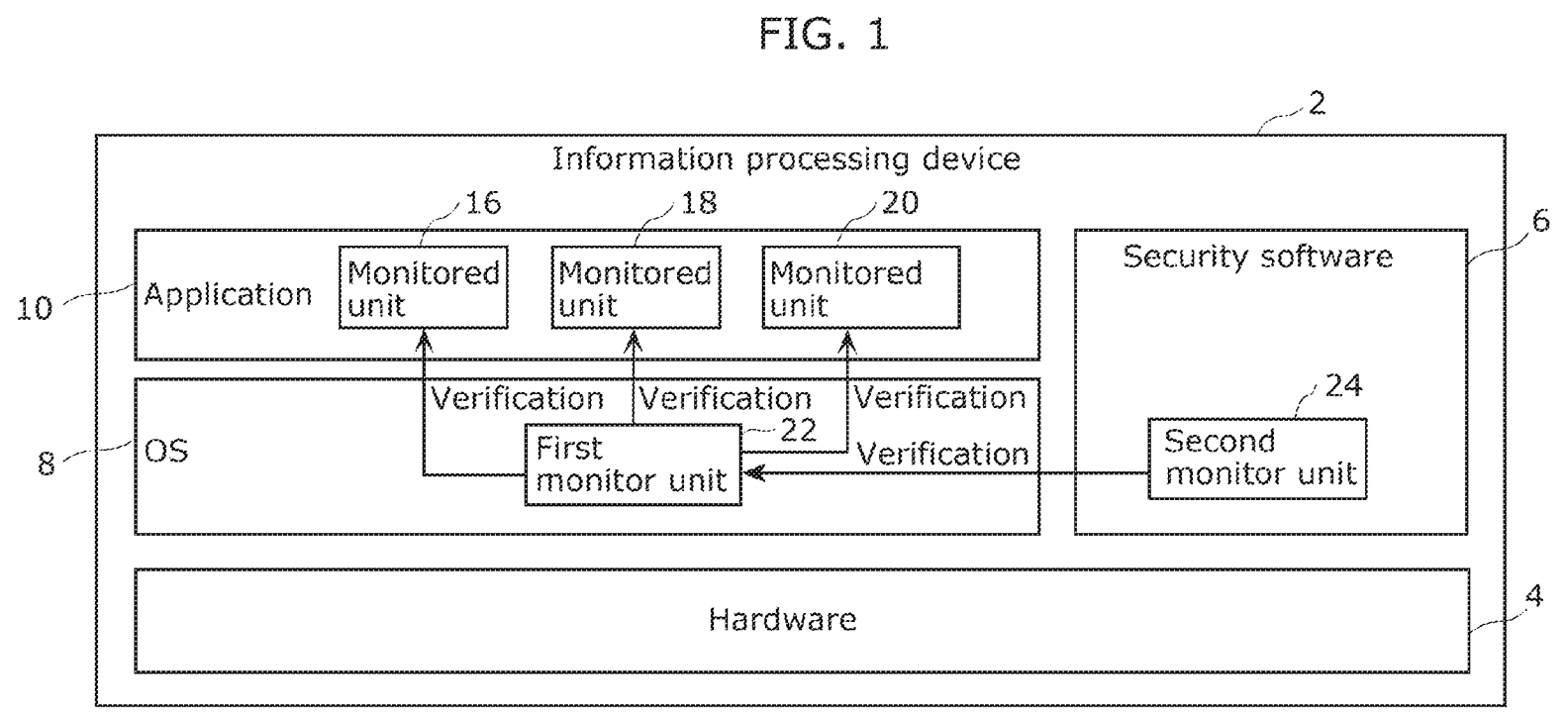

Information processing device
2
6
4
Security software
24
Second monitor unit
Application
10
Monitored unit
16
Monitored unit
18
Monitored unit
20
OS
8
First monitor unit
22
Verification
Verification
Verification
Verification
Hardware

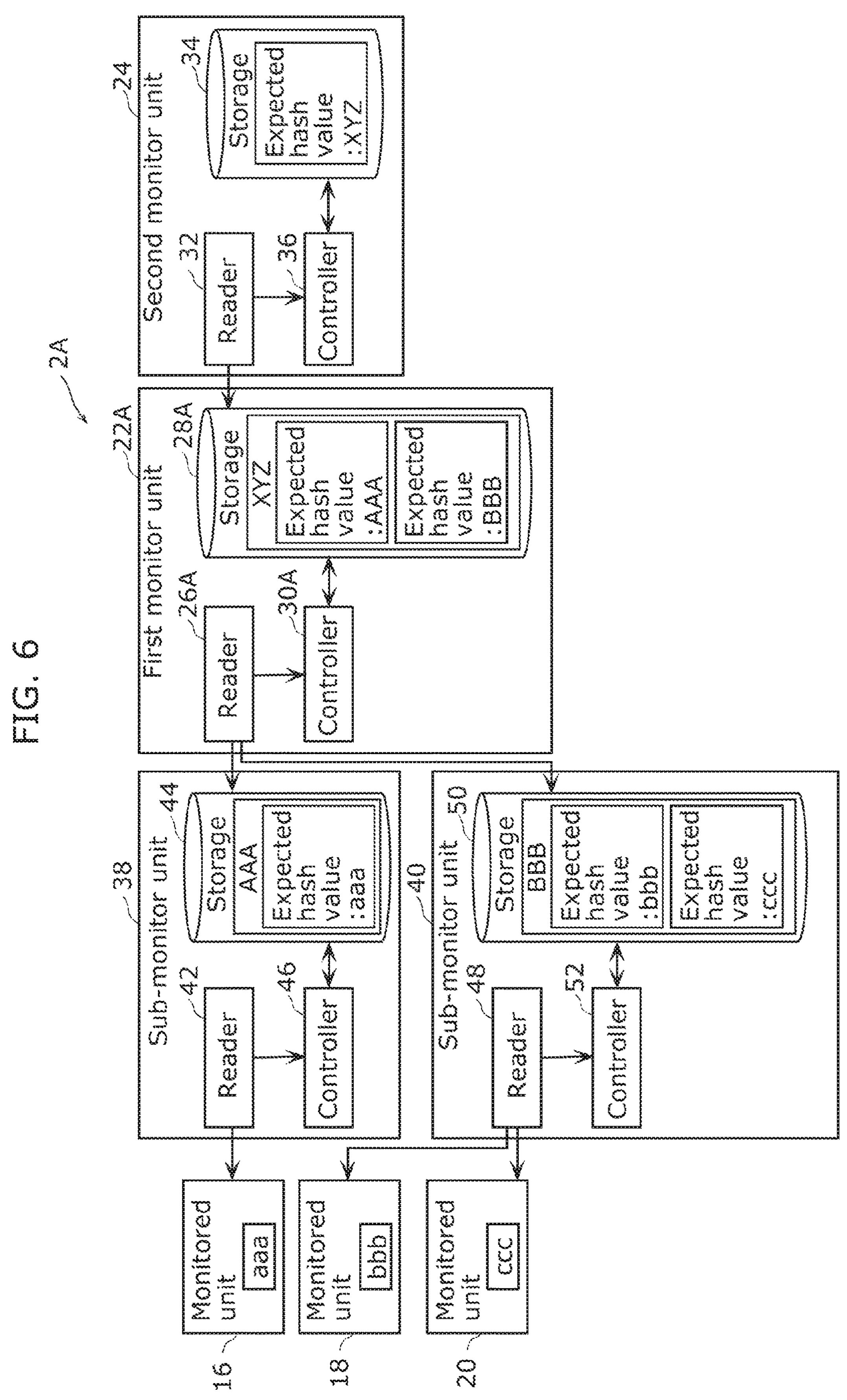
FIG. 6
2A
24
Second monitor unit
32
Reader
36
Controller
34
Storage
Expected hash value :XYZ
22A
First monitor unit
26A
Reader
30A
Controller
28A
Storage
XYZ
Expected hash value :AAA
Expected hash value :BBB
38
Sub-monitor unit
42
Reader
46
Controller
44
Storage
AAA
Expected hash value :aaa
40
Sub-monitor unit
48
Reader
52
Controller
50
Storage
BBB
Expected hash value :bbb
Expected hash value :ccc
Monitored unit
aaa
16
Monitored unit
bbb
18
Monitored unit
ccc
20

INFORMATION PROCESSING DEVICE AND CONTROL METHOD FOR SECURELY PERFORMING INDIRECT MONITORING OF NON-SECURE REGION OF INFORMATION PROCESSING DEVICE

This is a continuation application of PCT International Application No. PCT/JP2023/003978 filed on Feb. 7, 2023, designating the United States of America, which is based on and claims priority of Japanese Patent Application No. 2022-146517 filed on Sep. 14, 2022.

FIELD

The present disclosure relates to an information processing device and a control method for an information processing device.

BACKGROUND

As security measures for firmware, not only integrity verification (secure boot) at the time of firmware startup but also constant integrity (runtime integrity (RI)) verification, i.e. integrity verification repeatedly performed after firmware startup, is desired.

An information processing device used in conventional security measures has a program region that is divided into a non-secure region and a secure region having a higher security level than the non-secure region (see, for example, Patent Literature (PTL) 1). The non-secure region includes a monitored unit that operates in the non-secure region. The secure region includes a monitor unit that monitors the monitored unit. The monitor unit calculates a hash value of the monitored unit, and executes constant integrity verification for the monitored unit based on the calculated hash value.

CITATION LIST

Patent Literature

PTL 1: Japanese Patent No. 6067449

SUMMARY

However, the foregoing conventional security measures can be improved upon.

The present disclosure therefore provides an information processing device and a control method for an information processing device capable of improving upon the above related art.

An information processing device according to an aspect of the present disclosure includes: a first monitored unit; a first monitor unit that monitors the first monitored unit, and repeatedly verifies the first monitored unit by comparing a hash value of the first monitored unit with a first expected hash value that is an expected value of the hash value of the first monitored unit; and a second monitor unit that is more secure than the first monitor unit, monitors the first monitor unit, and repeatedly verifies the first monitor unit by comparing a hash value of the first monitor unit with a second expected hash value that is an expected value of the hash value of the first monitor unit, the hash value of the first monitor unit including the first expected hash value.

These general and specific aspects may be implemented using a system, a method, an integrated circuit, a computer program, or a computer-readable recording medium such as compact disc-read only memory (CD-ROM), or any combination of systems, methods, integrated circuits, computer programs, and recording media.

With the information processing device, etc., the above related art can be improved upon.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 1 is a diagram illustrating an overview of an information processing device according to Embodiment 1.

FIG. 6 is a block diagram illustrating the functional structure of an information processing device according to Embodiment 2.

Figure 2:
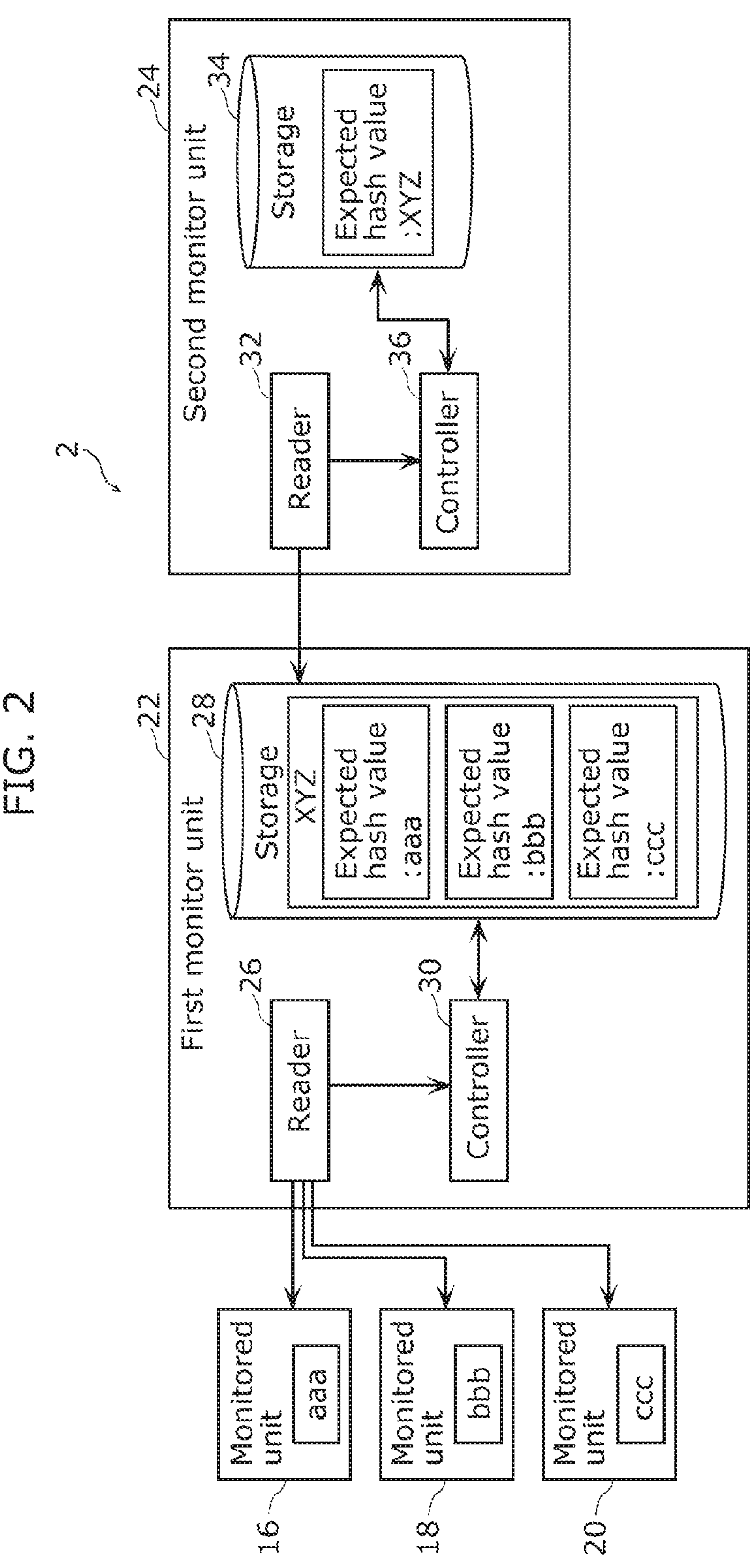
FIG. 2 is a block diagram illustrating the functional structure of the information processing device according to Embodiment 1.

DESCRIPTION OF EMBODIMENTS (Underlying Knowledge Forming Basis of the Present Disclosure)

The present inventors found that the related art described in "Background Art" section has the following problem.

The foregoing conventional security measures have a problem in that, as the number of monitored units in the non-secure region increases, the processing load required to execute constant integrity verification for each of the plurality of monitored units increases in the secure region.

In order to solve such a problem, an information processing device according to a first aspect of the present disclosure includes: a first monitored unit; a first monitor unit that monitors the first monitored unit, and repeatedly verifies the first monitored unit by comparing a hash value of the first monitored unit with a first expected hash value that is an expected value of the hash value of the first monitored unit; and a second monitor unit that is more secure than the first monitor unit, monitors the first monitor unit, and repeatedly verifies the first monitor unit by comparing a hash value of the first monitor unit with a second expected hash value that is an expected value of the hash value of the first monitor unit, the hash value of the first monitor unit including the first expected hash value.

According to this aspect, the first monitor unit monitors the first monitored unit, and the second monitor unit, which is more secure than the first monitor unit, monitors the first monitor unit. Thus, in the case where the number of first monitored units increases, the number of times the first monitor unit verifies each of a large number of first monitored units increases but the number of times the second monitor unit verifies the first monitor unit does not increase. As a result, even in the case where the processing resources of the second monitor unit are less than those of the first monitor unit, a shortage of processing resources of the second monitor unit can be avoided because the processing load on the second monitor unit can be reduced.

In a second aspect of the present disclosure, in the information processing device according to the first aspect, the first monitor unit may include: a first storage that stores the first expected hash value; and a first controller that repeatedly verifies the first monitored unit by calculating the hash value of the first monitored unit and comparing the hash value calculated with the first expected hash value stored in the first storage, and the second monitor unit may include: a second storage that stores the second expected hash value; and a second controller that repeatedly verifies the first monitor unit by calculating the hash value of the first monitor unit and comparing the hash value calculated with the second expected hash value stored in the second storage.

According to this aspect, the verification by the first monitor unit and the second monitor unit can be performed easily.

In a third aspect of the present disclosure, the information processing device according to the second aspect may further include: a second monitored unit, and the first monitored unit may include: a third storage that stores a third expected hash value that is an expected value of a hash value of the second monitored unit; and a third controller that repeatedly verifies the second monitored unit by calculating the hash value of the second monitored unit and comparing the hash value calculated with the third expected hash value stored in the third storage.

According to this aspect, verification processing is distributed between the first monitor unit and the first monitored unit, so that verification can be executed efficiently.

In a fourth aspect of the present disclosure, in the information processing device according to the second aspect or the third aspect, the first monitored unit may comprise a plurality of first monitored units, and the first controller may determine, as a first monitored unit to be verified, a first monitored unit higher in priority among the plurality of first monitored units.

According to this aspect, verification can be sped up.

A control method for an information processing device according to a fifth aspect of the present disclosure is a control method for an information processing device that includes: a monitored unit; a first monitor unit that monitors the monitored unit; and a second monitor unit that is more secure than the first monitor unit and monitors the first monitor unit, the control method including: repeatedly verifying, by the first monitor unit, the monitored unit by comparing a hash value of the monitored unit with a first expected hash value that is an expected value of the hash value of the monitored unit; and repeatedly verifying, by the second monitor unit, the first monitor unit by comparing a hash value of the first monitor unit with a second expected hash value that is an expected value of the hash value of the first monitor unit, the hash value of the first monitor unit including the first expected hash value.

According to this aspect, the processing load on the second monitor unit can be reduced, with it being possible to avoid a shortage of processing resources of the second monitor unit, as mentioned above.

These general and specific aspects may be implemented using a system, a method, an integrated circuit, a computer program, or a computer-readable recording medium such as CD-ROM, or any combination of systems, methods, integrated circuits, computer programs, and recording media.

Embodiments will be described in detail below, with reference to the drawings.

The embodiments described below each show a general or specific example. The numerical values, shapes, materials, structural elements, the arrangement and connection of the structural elements, steps, the processing order of the steps etc. shown in the following embodiments are mere examples, and do not limit the scope of the present disclosure. Of the structural elements in the embodiments described below, the structural elements not recited in any one of the independent claims representing the broadest concepts are described as optional structural elements.

Embodiment 1

[1-1. Overview of Information Processing Device]

First, an overview of information processing device 2 according to Embodiment 1 will be described with reference to FIG. 1. FIG. 1 is a diagram illustrating an overview of information processing device 2 according to Embodiment 1.

As illustrated in FIG. 1, information processing device 2 according to Embodiment 1 includes hardware 4, security software 6, operating system (OS) 8, and application 10. Information processing device 2 is a device that, after startup (activation) of each computer program (hereafter simply referred to as "program"), executes constant integrity (RI) verification, i.e. repeatedly performs integrity verification, for the program, for example in an in-vehicle network mounted on a vehicle such as an automobile. Herein, "integrity" means that the program in information processing device 2 has not been subjected to unauthorized tampering or the like.

Hardware 4 includes a processor that includes a central processing unit (CPU), an electronic control unit (ECU), or the like, and provides an execution environment for a plurality of programs. In this embodiment, constant integrity (RI) verification for each program is executed using hardware 4 as a root of trust, for example.

Security software 6 is software for security management that is executed on hardware 4 and ensures the safety of data, programs, etc. in information processing device 2.

Operating system 8 is an operating system that operates on hardware 4.

Application 10 is application software that operates on operating system 8.

Information processing device 2 further includes a plurality of monitored units 16, 18, and 20 (each of which is an example of a first monitored unit), first monitor unit 22, and second monitor unit 24.

Each of the plurality of monitored units 16, 18, and 20 is an intrusion detection system (IDS), a library, or the like, and operates on application 10. Each of the plurality of monitored units 16, 18, and 20 is implemented by a program execution unit such as a CPU or a processor reading and executing a program recorded in memory.

First monitor unit 22 monitors each of the plurality of monitored units 16, 18, and 20, and operates, for example, on operating system 8. Specifically, after activation of each of the plurality of monitored units 16, 18, and 20, first monitor unit 22 executes constant integrity verification, i.e. repeatedly performs integrity verification, for the monitored unit. First monitor unit 22 is implemented by a program execution unit such as a CPU or a processor reading and executing a program recorded in memory.

Although each of the plurality of monitored units 16, 18, and 20 operates on application 10 in this embodiment, the present disclosure is not limited to such, and at least one of the plurality of monitored units 16, 18, and 20 may operate on operating system 8. Although first monitor unit 22 operates on operating system 8 in this embodiment, the present disclosure is not limited to such, and first monitor unit 22 may operate on application 10.

Second monitor unit 24 monitors first monitor unit 22, and operates, for example, on security software 6. Specifically, after activation of first monitor unit 22, second monitor unit 24 executes constant integrity verification, i.e. repeatedly performs integrity verification, for first monitor unit 22. Second monitor unit 24 is more secure than first monitor unit 22. Specifically, second monitor unit 24 has program safety such as confidentiality and integrity ensured. Second monitor unit 24 is implemented by a program execution unit such as a CPU or a processor reading and executing a program recorded in memory.

Although second monitor unit 24 operates on security software 6 in this embodiment, the present disclosure is not limited to such, and second monitor unit 24 may operate on operating system 8 or application 10. In this case, while first monitor unit 22 and second monitor unit 24 operate in the same operating environment, second monitor unit 24 is more secure than first monitor unit 22 as a result of being implemented (for example, subjected to obfuscation or hardening) so as to be more difficult to be analyzed than first monitor unit 22.

[1-2. Functional Structure of Information Processing Device]

Next, the functional structure of information processing device 2 according to Embodiment 1 will be described with reference to FIG. 2. FIG. 2 is a block diagram illustrating the functional structure of information processing device 2 according to Embodiment 1.

As illustrated in FIG. 2, first monitor unit 22 includes, as its functional structure, reader 26, storage 28 (an example of a first storage), and controller 30 (an example of a first controller).

Reader 26 reads data (for example, source code, executable file, data file, etc.) related to monitored unit 16 from memory in monitored unit 16. Reader 26 also reads data (for example, source code, executable file, data file, etc.) related to monitored unit 18 from memory in monitored unit 18. Reader 26 also reads data (for example, source code, executable file, data file, etc.) related to monitored unit 20 from memory in monitored unit 20. Reader 26 outputs the read data to controller 30.

Storage 28 is memory that stores data (for example, source code, executable file, data file, etc.) related to first monitor unit 22. Specifically, storage 28 stores an expected hash value "aaa" (an example of a first expected hash value) which is an expected value of a hash value of monitored unit 16, an expected hash value "bbb" (an example of a first expected hash value) which is an expected value of a hash value of monitored unit 18, and an expected hash value "ccc" (an example of a first expected hash value) which is an expected value of a hash value of monitored unit 20. Each of the expected hash values "aaa", "bbb", and "ccc" is stored in storage 28 in advance, for example, when information processing device 2 is factory-shipped.

Controller 30 calculates the hash value of monitored unit 16 based on the data related to monitored unit 16 read by reader 26. Controller 30 then executes constant integrity verification, i.e. repeatedly performs integrity verification, for monitored unit 16 by comparing the calculated hash value of monitored unit 16 with the expected hash value "aaa" of monitored unit 16 stored in storage 28. Specifically, in the case where the calculated hash value (for example, "aaa") of monitored unit 16 and the expected hash value "aaa" of monitored unit 16 match, controller 30 determines that monitored unit 16 is normal. In the case where the calculated hash value (for example, "ddd") of monitored unit 16 and the expected hash value "aaa" of monitored unit 16 do not match, controller 30 determines that monitored unit 16 is anomalous (for example, the program has been tampered with).

Moreover, controller 30 calculates the hash value of monitored unit 18 based on the data related to monitored unit 18 read by reader 26. Controller 30 then executes constant integrity verification, i.e. repeatedly performs integrity verification, for monitored unit 18 by comparing the calculated hash value of monitored unit 18 with the expected hash value "bbb" of monitored unit 18 stored in storage 28. Specifically, in the case where the calculated hash value (for example, "bbb") of monitored unit 18 and the expected hash value "bbb" of monitored unit 18 match, controller 30 determines that monitored unit 18 is normal. In the case where the calculated hash value (for example, "eee") of monitored unit 18 and the expected hash value "bbb" of monitored unit 18 do not match, controller 30 determines that monitored unit 18 is anomalous.

Moreover, controller 30 calculates the hash value of monitored unit 20 based on the data related to monitored unit 20 read by reader 26. Controller 30 then executes constant integrity verification, i.e. repeatedly performs integrity verification, for monitored unit 20 by comparing the calculated hash value of monitored unit 20 with the expected hash value "ccc" of monitored unit 20 stored in storage 28. Specifically, in the case where the calculated hash value (for example, "ccc") of monitored unit 20 and the expected hash value "ccc" of monitored unit 20 match, controller 30 determines that monitored unit 20 is normal. In the case where the calculated hash value (for example, "fff") of monitored unit 20 and the expected hash value "ccc" of monitored unit 20 do not match, controller 30 determines that monitored unit 20 is anomalous.

Although each of the expected hash values "aaa", "bbb", and "ccc" is stored in storage 28 in advance when information processing device 2 is factory-shipped in this embodiment, the present disclosure is not limited to such. For example, controller 30 may dynamically generate each of the expected hash values "aaa", "bbb", and "ccc" and store it in storage 28 when information processing device 2 is activated for the first time. When information processing device 2 is activated for the first time, the possibility that each of the plurality of monitored units 16, 18, and 20 has been tampered with by an unauthorized program is very low. Accordingly, when information processing device 2 is activated for the first time, reader 26 reads the data related to monitored unit 16 from the memory in monitored unit 16, and controller 30 calculates the hash value (for example, "aaa") of monitored unit 16 based on the data related to monitored unit 16 read by reader 26. Controller 30 then stores the calculated hash value of monitored unit 16 in storage 28 as the expected hash value "aaa" of monitored unit 16. Likewise, when information processing device 2 is activated for the first time, controller 30 calculates the hash value (for example, "bbb") of monitored unit 18 and the hash value (for example, "ccc") of monitored unit 20, and stores the calculated hash values of monitored units 18 and 20 in storage 28 respectively as the expected hash value "bbb" of monitored unit 18 and the expected hash value "ccc" of monitored unit 20.

As illustrated in FIG. 2, second monitor unit 24 includes, as its functional structure, reader 32, storage 34 (an example of a second storage), and controller 36 (an example of a second controller).

Reader 32 reads data (for example, source code, executable file, data file, etc.) related to first monitor unit 22 from storage 28 in first monitor unit 22. The data related to first monitor unit 22 includes the expected hash value "aaa" of monitored unit 16, the expected hash value "bbb" of monitored unit 18, and the expected hash value "ccc" of monitored unit 20. Reader 32 outputs the read data to controller 36.

Storage 34 is memory that stores data (for example, source code, executable file, data file, etc.) related to second monitor unit 24. Specifically, storage 34 stores an expected hash value "XYZ" (an example of a second expected hash value) which is an expected value of a hash value of first monitor unit 22. The expected hash value "XYZ" is generated by hashing the data related to first monitor unit 22, including the respective expected hash values "aaa", "bbb", and "ccc" of the plurality of monitored units 16, 18, and 20. The expected hash value "XYZ" is stored in storage 34 in advance, for example, when information processing device 2 is factory-shipped.

Controller 36 calculates the hash value of first monitor unit 22 based on the data related to first monitor unit 22 read by reader 32. Controller 36 then executes constant integrity verification, i.e. repeatedly performs integrity verification, for first monitor unit 22 by comparing the calculated hash value of first monitor unit 22 with the expected hash value "XYZ" of first monitor unit 22 stored in storage 34. Specifically, in the case where the calculated hash value (for example, "XYZ") of first monitor unit 22 and the expected hash value "XYZ" of first monitor unit 22 match, controller 36 determines that first monitor unit 22 is normal. In the case where the calculated hash value (for example, "ZZZ") of first monitor unit 22 and the expected hash value "XYZ" of first monitor unit 22 do not match, controller 36 determines that first monitor unit 22 is anomalous.

Although the expected hash value "XYZ" is stored in storage 34 in advance when information processing device 2 is factory-shipped in this embodiment, the present disclosure is not limited to such. Controller 36 may dynamically generate the expected hash value "XYZ" and store it in storage 34 when information processing device 2 is activated for the first time.

[1-3. Operation of Information Processing Device]

Figure 3:
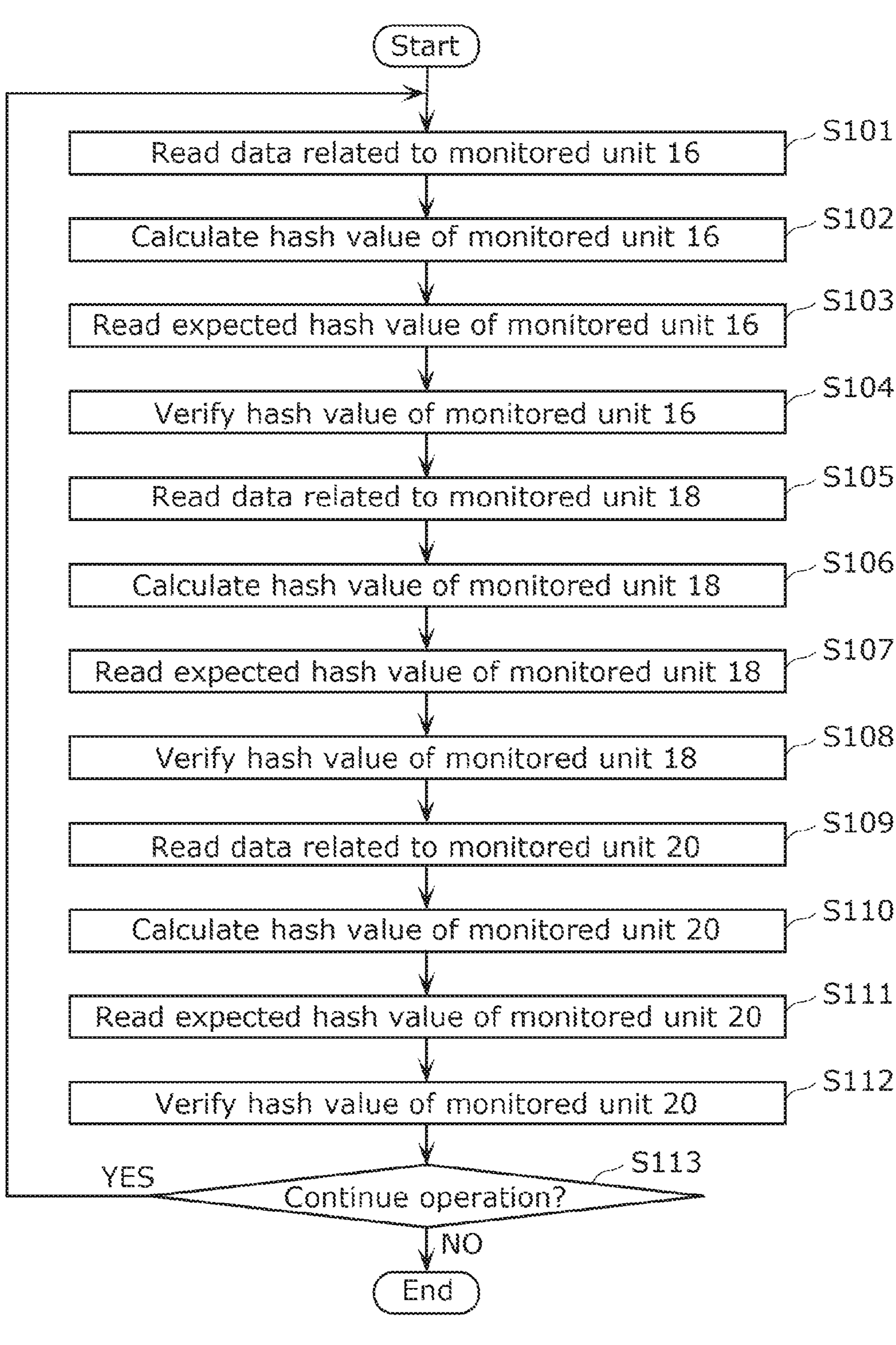
FIG. 3 is a flowchart illustrating the flow of operation of a first monitor unit according to Embodiment 1.

Next, the operation of first monitor unit 22 according to Embodiment 1 will be described with reference to FIG. 3. FIG. 3 is a flowchart illustrating the flow of operation of first monitor unit 22 according to Embodiment 1.

First, when information processing device 2 starts operating, various programs of information processing device 2 are started. At the time of startup (activation) of various programs, secure boot for each program is executed as necessary. As illustrated in FIG. 3, reader 26 in first monitor unit 22 reads data related to monitored unit 16 from the memory in monitored unit 16 after monitored unit 16 is activated (S101). Following this, controller 30 in first monitor unit 22 calculates a hash value of monitored unit 16 based on the data related to monitored unit 16 read by reader 26 (S102).

Controller 30 then reads the expected hash value "aaa" of monitored unit 16 from storage 28 (S103). Although Step S103 is performed after Step S102 in this embodiment, the present disclosure is not limited to such, and Step S102 may be performed after Step S103. In detail, controller 30 may read the expected hash value "aaa" of monitored unit 16 from storage 28, and then calculate the hash value of monitored unit 16 based on the data related to monitored unit 16 read by reader 26.

Controller 30 then verifies the hash value of monitored unit 16 by comparing the calculated hash value of monitored unit 16 with the expected hash value "aaa" of monitored unit 16 read from storage 28 (S104). In detail, controller 30 executes constant integrity verification for monitored unit 16 by verifying whether the hash value of monitored unit 16 matches the expected hash value "aaa".

After Step S104, reader 26 reads data related to monitored unit 18 from the memory in monitored unit 18 after monitored unit 18 is activated (S105). Following this, controller 30 calculates a hash value of monitored unit 18 based on the data related to monitored unit 18 read by reader 26 (S106).

Controller 30 then reads the expected hash value "bbb" of monitored unit 18 from storage 28 (S107). Controller 30 then verifies the hash value of monitored unit 18 by comparing the calculated hash value of monitored unit 18 with the expected hash value "bbb" of monitored unit 18 read from storage 28 (S108). In detail, controller 30 executes constant integrity verification for monitored unit 18 by verifying whether the hash value of monitored unit 18 matches the expected hash value "bbb".

After Step S108, reader 26 reads data related to monitored unit 20 from the memory in monitored unit 20 after monitored unit 20 is activated (S109). Following this, controller 30 calculates a hash value of monitored unit 20 based on the data related to monitored unit 20 read by reader 26 (S110).

Controller 30 then reads the expected hash value "ccc" of monitored unit 20 from storage 28 (S111). Controller 30 then verifies the hash value of monitored unit 20 by comparing the calculated hash value of monitored unit 20 with the expected hash value "ccc" of monitored unit 20 read from storage 28 (S112). In detail, controller 30 executes constant integrity verification for monitored unit 20 by verifying whether the hash value of monitored unit 20 matches the expected hash value "ccc".

After Step S112, in the case of continuing the operation of information processing device 2 (S113: YES), the process returns to Step S101. In the case of stopping the operation of information processing device 2 (S113: NO), the flowchart in FIG. 3 ends.

The process in the flowchart in FIG. 3, that is, constant integrity verification for each of the plurality of monitored units 16, 18, and 20 by first monitor unit 22, may be repeatedly executed with a predetermined period (for example, once per second). In this case, controller 30 may dynamically change the predetermined period depending on various conditions. Alternatively, constant integrity verification for each of monitored units 16, 18, and 20 by first monitor unit 22 may be executed each time a trigger signal is received from the outside.

Although controller 30 executes constant integrity verification for the plurality of monitored units 16, 18, and 20 sequentially in this embodiment, the present disclosure is not limited to such, and controller 30 may execute constant integrity verification for the plurality of monitored units 16, 18, and 20 concurrently.

Figure 4:
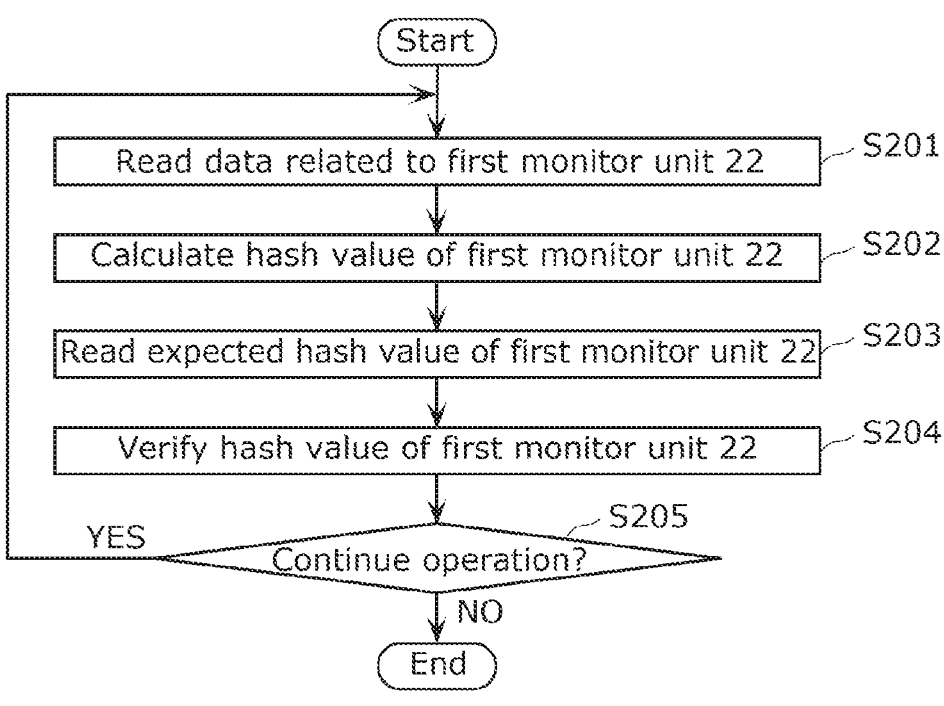
FIG. 4 is a flowchart illustrating the flow of operation of a second monitor unit according to Embodiment 1.

Next, the operation of second monitor unit 24 according to Embodiment 1 will be described with reference to FIG. 4. FIG. 4 is a flowchart illustrating the flow of operation of second monitor unit 24 according to Embodiment 1.

First, when information processing device 2 starts operating, various programs of information processing device 2 are started (activated). As illustrated in FIG. 4, reader 32 in second monitor unit 24 reads data related to first monitor unit 22 from storage 28 in first monitor unit 22 after first monitor unit 22 is activated (S201). Following this, controller 36 in second monitor unit 24 calculates a hash value of first monitor unit 22 based on the data related to first monitor unit 22 read by reader 32 (S202).

Controller 36 then reads the expected hash value "XYZ" of first monitor unit 22 from storage 34 (S203). Although Step S203 is performed after Step S202 in this embodiment, the present disclosure is not limited to such, and Step S202 may be performed after Step S203. In detail, controller 36 may read the expected hash value "XYZ" of first monitor unit 22 from storage 34, and then calculate the hash value of first monitor unit 22 based on the data related to first monitor unit 22 read by reader 32.

Controller 36 then verifies the hash value of first monitor unit 22 by comparing the calculated hash value of first monitor unit 22 with the expected hash value "XYZ" of first monitor unit 22 read from storage 34 (S204). In detail, controller 36 executes constant integrity verification for first monitor unit 22 by verifying whether the hash value of first monitor unit 22 matches the expected hash value "XYZ".

For example, if monitored unit 16 is tampered with by an unauthorized program, the expected hash value "aaa" of monitored unit 16 stored in storage 28 in first monitor unit 22 may also be tampered with by the unauthorized program. In this case, the hash value of first monitor unit 22 calculated by controller 36 in second monitor unit 24 does not match the expected hash value "XYZ". Controller 36 in second monitor unit 24 can thus detect an anomaly in monitored unit 16 indirectly. In other words, as a result of second monitor unit 24 monitoring first monitor unit 22, the integrity of each of the plurality of monitored units 16, 18, and 20 can be indirectly ensured.

After Step S204, in the case of continuing the operation of information processing device 2 (S205: YES), the process returns to Step S201. In the case of stopping the operation of information processing device 2 (S205: NO), the flowchart in FIG. 4 ends.

The process in the flowchart in FIG. 4, that is, constant integrity verification for first monitor unit 22 by second monitor unit 24, may be repeatedly executed with a predetermined period (for example, once per second). In this case, controller 36 may dynamically change the predetermined period depending on various conditions. Alternatively, constant integrity verification for first monitor unit 22 by second monitor unit 24 may be executed each time a trigger signal is received from the outside.

[1-4. Effects]

Figure 5:
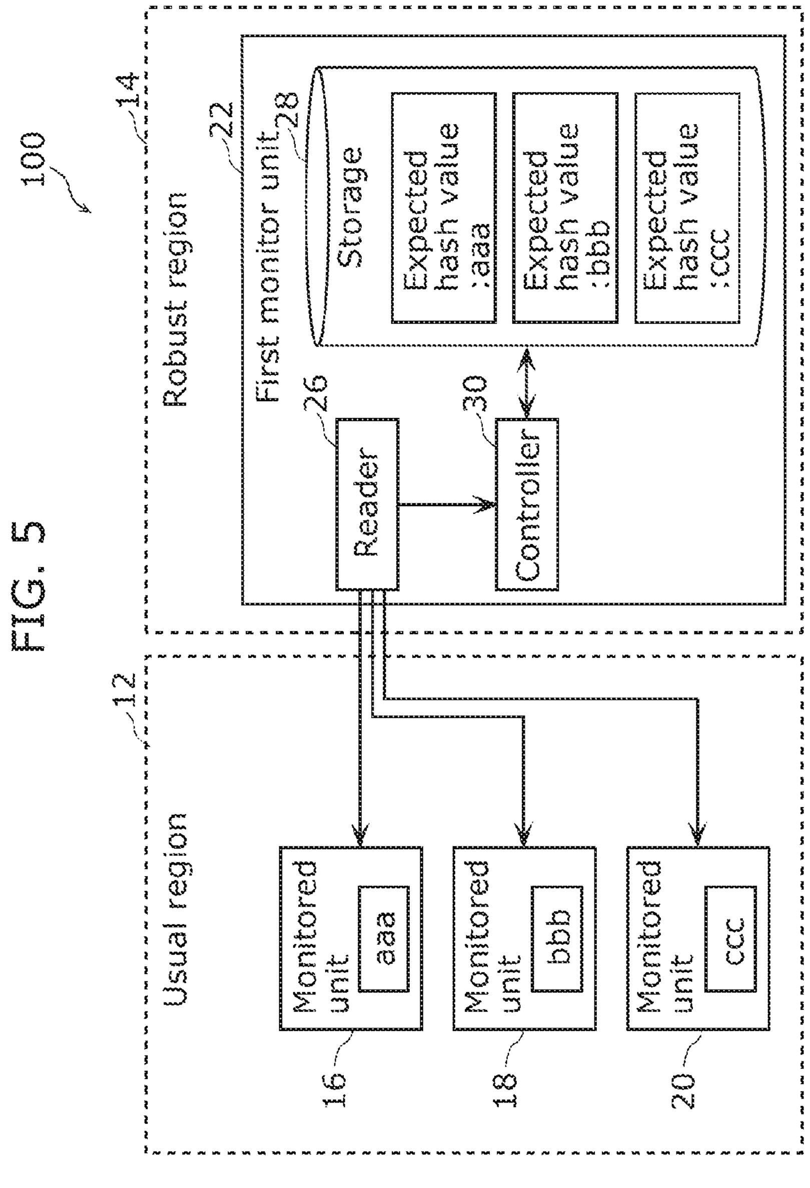
FIG. 5 is a block diagram illustrating the functional structure of an information processing device according to a comparative example.

The functional structure of information processing device 100 according to a comparative example will be described with reference to FIG. 5. FIG. 5 is a block diagram illustrating the functional structure of information processing device 100 according to the comparative example. In this example, the same structural elements as those in information processing device 2 according to Embodiment 1 are given the same reference signs and their description will be omitted.

As illustrated in FIG. 5, information processing device 100 according to the comparative example includes usual region 12 and robust region 14 having a security level higher than the security level of usual region 12. Usual region 12 includes a plurality of monitored units 16, 18, and 20, and robust region 14 includes first monitor unit 22. First monitor unit 22 monitors each of the plurality of monitored units 16, 18, and 20, and operates in robust region 14.

Typically, the processing resources allocated to robust region 14 are less than the processing resources allocated to usual region 12. In information processing device 100 according to the comparative example, as the number of monitored units in usual region 12 increases, the number of times first monitor unit 22 executes constant integrity verification for each monitored unit increases in robust region 14. As a result, the processing load (for example, processing time, memory capacity, and overhead of access from robust region 14 to usual region 12) required to execute constant integrity verification for each of a large number of monitored units (including the plurality of monitored units 16, 18, and 20) increases in robust region 14, causing a shortage of processing resources in robust region 14.

In information processing device 2 according to Embodiment 1, first monitor unit 22 monitors each of the plurality of monitored units 16, 18, and 20, and second monitor unit 24 which is more secure than first monitor unit 22 monitors first monitor unit 22, as described above. Thus, in the case where the number of monitored units increases, the number of times first monitor unit 22 executes constant integrity verification for each of a large number of monitored units (including the plurality of monitored units 16, 18, and 20) increases but the number of times second monitor unit 24 executes constant integrity verification for first monitor unit 22 does not increase. As a result, even in the case where the processing resources allocated to second monitor unit 24 are less than the processing resources allocated to first monitor unit 22, a shortage of processing resources of second monitor unit 24 can be avoided because the processing load on second monitor unit 24 can be reduced.

Embodiment 2

[2-1. Functional Structure of Information Processing Device]

The functional structure of information processing device 2A according to Embodiment 2 will be described with reference to FIG. 6. FIG. 6 is a block diagram illustrating the functional structure of information processing device 2A according to Embodiment 2. In this embodiment, the same structural elements as those in information processing device 2 according to Embodiment 1 are given the same reference signs and their description will be omitted.

As illustrated in FIG. 6, information processing device 2A according to Embodiment 2 includes a plurality of monitored units 16, 18, and 20 (each of which is an example of a second monitored unit), a plurality of sub-monitor units 38 and 40 (each of which is an example of a first monitored unit), first monitor unit 22A, and second monitor unit 24.

Sub-monitor unit 38 monitors monitored unit 16. Specifically, after activation of monitored unit 16, sub-monitor unit 38 executes constant integrity verification, i.e. repeatedly performs integrity verification, for monitored unit 16. Sub-monitor unit 38 includes, as its functional structure, reader 42, storage 44 (an example of a third storage), and controller 46 (an example of a third controller). Sub-monitor unit 38 is implemented by a program execution unit such as a CPU or a processor reading and executing a program recorded in memory.

Reader 42 reads data (for example, source code, executable file, data file, etc.) related to monitored unit 16 from memory in monitored unit 16. Reader 42 outputs the read data to controller 46.

Storage 44 is memory that stores data (for example, source code, executable file, data file, etc.) related to sub-monitor unit 38. Specifically, storage 44 stores an expected hash value "aaa" (an example of a third expected hash value) which is an expected value of a hash value of monitored unit 16.

Controller 46 calculates the hash value of monitored unit 16 based on the data related to monitored unit 16 read by reader 42.

Controller 46 then executes constant integrity verification, i.e. repeatedly performs integrity verification, for monitored unit 16 by comparing the calculated hash value of monitored unit 16 with the expected hash value "aaa" of monitored unit 16 stored in storage 44. Specifically, in the case where the calculated hash value (for example, "aaa") of monitored unit 16 and the expected hash value "aaa" of monitored unit 16 match, controller 46 determines that monitored unit 16 is normal. In the case where the calculated hash value (for example, "ddd") of monitored unit 16 and the expected hash value "aaa" of monitored unit 16 do not match, controller 46 determines that monitored unit 16 is anomalous.

Sub-monitor unit 40 monitors each of monitored units 18 and 20. Specifically, after activation of each of monitored units 18 and 20, sub-monitor unit 40 executes constant integrity verification, i.e. repeatedly performs integrity verification, for the monitored unit. Sub-monitor unit 40 includes, as its functional structure, reader 48, storage 50 (an example of a third storage), and controller 52 (an example of a third controller). Sub-monitor unit 40 is implemented by a program execution unit such as a CPU or a processor reading and executing a program recorded in memory.

Reader 48 reads data (for example, source code, executable file, data file, etc.) related to monitored unit 18 from memory in monitored unit 18. Reader 48 also reads data (for example, source code, executable file, data file, etc.) related to monitored unit 20 from memory in monitored unit 20. Reader 48 outputs the read data to controller 52.

Storage 50 is memory that stores data (for example, source code, executable file, data file, etc.) related to sub-monitor unit 40. Specifically, storage 50 stores an expected hash value "bbb" (an example of a third expected hash value) which is an expected value of a hash value of monitored unit 18. Storage 50 also stores an expected hash value "ccc" (an example of a third expected hash value) which is an expected value of a hash value of monitored unit 20.

Controller 52 calculates the hash value of monitored unit 18 based on the data related to monitored unit 18 read by reader 48. Controller 52 then executes constant integrity verification, i.e. repeatedly performs integrity verification, for monitored unit 18 by comparing the calculated hash value of monitored unit 18 with the expected hash value "bbb" of monitored unit 18 stored in storage 50. Specifically, in the case where the calculated hash value (for example, "bbb") of monitored unit 18 and the expected hash value "bbb" of monitored unit 18 match, controller 52 determines that monitored unit 18 is normal. In the case where the calculated hash value (for example, "eee") of monitored unit 18 and the expected hash value "bbb" of monitored unit 18 do not match, controller 52 determines that monitored unit 18 is anomalous.

Moreover, controller 52 calculates the hash value of monitored unit 20 based on the data related to monitored unit 20 read by reader 48. Controller 52 then executes constant integrity verification, i.e. repeatedly performs integrity verification, for monitored unit 20 by comparing the calculated hash value of monitored unit 20 with the expected hash value "ccc" of monitored unit 20 stored in storage 50. Specifically, in the case where the calculated hash value (for example, "ccc") of monitored unit 20 and the expected hash value "ccc" of monitored unit 20 match, controller 52 determines that monitored unit 20 is normal. In the case where the calculated hash value (for example, "fff") of monitored unit 20 and the expected hash value "ccc" of monitored unit 20 do not match, controller 52 determines that monitored unit 20 is anomalous.

First monitor unit 22A monitors each of the plurality of sub-monitor units 38 and 40. Specifically, after activation of each of the plurality of sub-monitor units 38 and 40, first monitor unit 22A executes constant integrity verification, i.e. repeatedly performs integrity verification, for the sub-monitor unit. First monitor unit 22A includes, as its functional structure, reader 26A, storage 28A (an example of a first storage), and controller 30A (an example of a first controller).

Reader 26A reads data (for example, source code, executable file, data file, etc.) related to sub-monitor unit 38 from storage 44 in sub-monitor unit 38. Reader 26A also reads data (for example, source code, executable file, data file, etc.) related to sub-monitor unit 40 from storage 50 in sub-monitor unit 40. Reader 26A outputs the read data to controller 30A.

Storage 28A is memory that stores data (for example, source code, executable file, data file, etc.) related to first monitor unit 22A. Specifically, storage 28A stores an expected hash value "AAA" (an example of a first expected hash value) which is an expected value of a hash value of sub-monitor unit 38, and an expected hash value "BBB" (an example of a first expected hash value) which is an expected value of a hash value of sub-monitor unit 40.

Controller 30A calculates the hash value of sub-monitor unit 38 based on the data related to sub-monitor unit 38 read by reader 26A. Controller 30A then executes constant integrity verification, i.e. repeatedly performs integrity verification, for sub-monitor unit 38 by comparing the calculated hash value of sub-monitor unit 38 with the expected hash value "AAA" of sub-monitor unit 38 stored in storage 28A. Specifically, in the case where the calculated hash value (for example, "AAA") of sub-monitor unit 38 and the expected hash value "AAA" of sub-monitor unit 38 match, controller 30A determines that sub-monitor unit 38 is normal. In the case where the calculated hash value (for example, "CCC") of sub-monitor unit 38 and the expected hash value "AAA" of sub-monitor unit 38 do not match, controller 30A determines that sub-monitor unit 38 is anomalous.

Moreover, controller 30A calculates the hash value of sub-monitor unit 40 based on the data related to sub-monitor unit 40 read by reader 26A. Controller 30A then executes constant integrity verification, i.e. repeatedly performs integrity verification, for sub-monitor unit 40 by comparing the calculated hash value of sub-monitor unit 40 with the expected hash value "BBB" of sub-monitor unit 40 stored in storage 28A. Specifically, in the case where the calculated hash value (for example, "BBB") of sub-monitor unit 40 and the expected hash value "BBB" of sub-monitor unit 40 match, controller 30A determines that sub-monitor unit 40 is normal. In the case where the calculated hash value (for example, "DDD") of sub-monitor unit 40 and the expected hash value "BBB" of sub-monitor unit 40 do not match, controller 30A determines that sub-monitor unit 40 is anomalous.

[2-2. Operation of Information Processing Device]

Next, the operation of sub-monitor unit 38 according to Embodiment 2 will be described with reference to FIG. 7.

Figure 7:
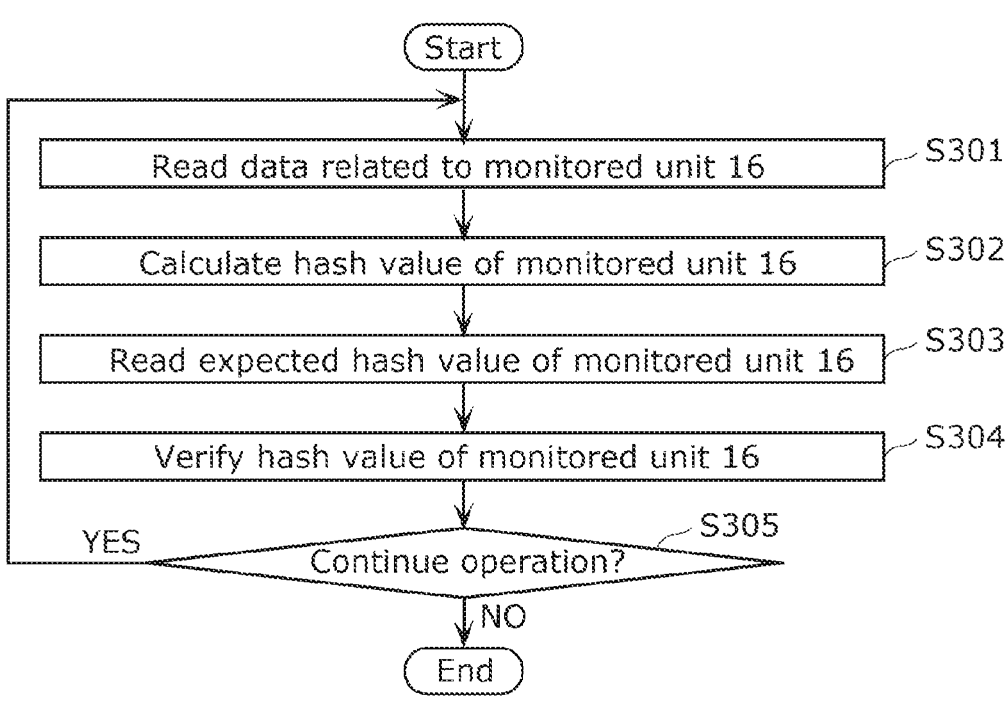
FIG. 7 is a flowchart illustrating the flow of operation of a sub-monitor unit according to Embodiment 2.

FIG. 7 is a flowchart illustrating the flow of operation of sub-monitor unit 38 according to Embodiment 2.

First, when information processing device 2A starts operating, various programs of information processing device 2A are started (activated). As illustrated in FIG. 7, reader 42 in sub-monitor unit 38 reads data related to monitored unit 16 from the memory in monitored unit 16 after monitored unit 16 is activated (S301). Following this, controller 46 in sub-monitor unit 38 calculates a hash value of monitored unit 16 based on the data related to monitored unit 16 read by reader 42 (S302).

Controller 46 then reads the expected hash value "aaa" of monitored unit 16 from storage 44 (S303). Controller 46 then verifies the hash value of monitored unit 16 by comparing the calculated hash value of monitored unit 16 with the expected hash value "aaa" of monitored unit 16 read from storage 44 (S304). In detail, controller 46 executes constant integrity verification for monitored unit 16 by verifying whether the hash value of monitored unit 16 matches the expected hash value "aaa".

After Step S304, in the case of continuing the operation of information processing device 2A (S305: YES), the process returns to Step S301. In the case of stopping the operation of information processing device 2A (S305: NO), the flowchart in FIG. 7 ends.

Figure 8:
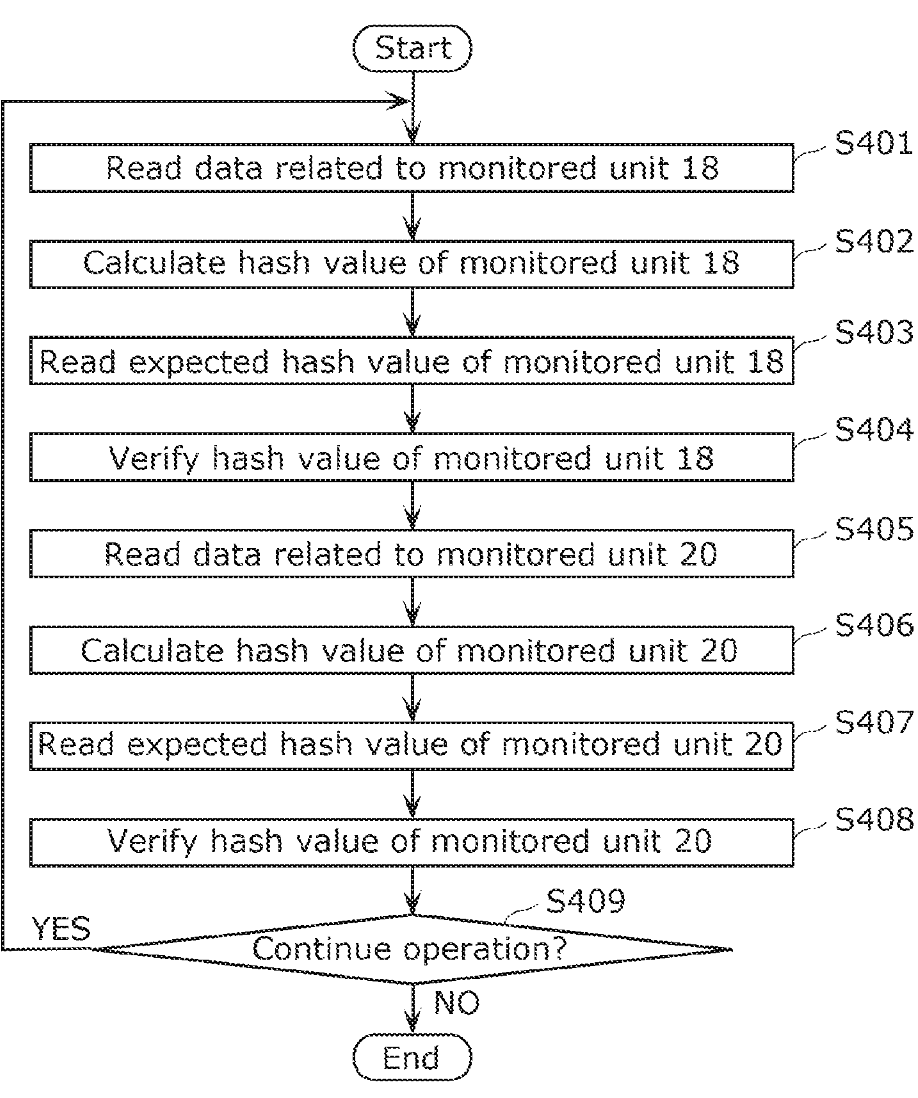
FIG. 8 is a flowchart illustrating the flow of operation of a sub-monitor unit according to Embodiment 2.

Next, the operation of sub-monitor unit 40 according to Embodiment 2 will be described with reference to FIG. 8. FIG. 8 is a flowchart illustrating the flow of operation of sub-monitor unit 40 according to Embodiment 2.

First, when information processing device 2A starts operating, various programs of information processing device 2A are started (activated). As illustrated in FIG. 8, reader 48 in sub-monitor unit 40 reads data related to monitored unit 18 from the memory in monitored unit 18 after monitored unit 18 is activated (S401). Following this, controller 52 in sub-monitor unit 40 calculates a hash value of monitored unit 18 based on the data related to monitored unit 18 read by reader 48 (S402).

Controller 52 then reads the expected hash value "bbb" of monitored unit 18 from storage 50 (S403). Controller 52 then verifies the hash value of monitored unit 18 by comparing the calculated hash value of monitored unit 18 with the expected hash value "bbb" of monitored unit 18 read from storage 50 (S404). In detail, controller 52 executes constant integrity verification for monitored unit 18 by verifying whether the hash value of monitored unit 18 matches the expected hash value "bbb".

After Step S404, reader 48 reads data related to monitored unit 20 from the memory in monitored unit 20 after monitored unit 20 is activated (S405). Following this, controller 52 calculates a hash value of monitored unit 20 based on the data related to monitored unit 20 read by reader 48 (S406).

Controller 52 then reads the expected hash value "ccc" of monitored unit 20 from storage 50 (S407). Controller 52 then verifies the hash value of monitored unit 20 by comparing the calculated hash value of monitored unit 20 with the expected hash value "ccc" of monitored unit 20 read from storage 50 (S408). In detail, controller 52 executes constant integrity verification for monitored unit 20 by verifying whether the hash value of monitored unit 20 matches the expected hash value "ccc".

After Step S408, in the case of continuing the operation of information processing device 2A (S409: YES), the process returns to Step S401. In the case of stopping the operation of information processing device 2A (S409: NO), the flowchart in FIG. 8 ends.

Figure 9:
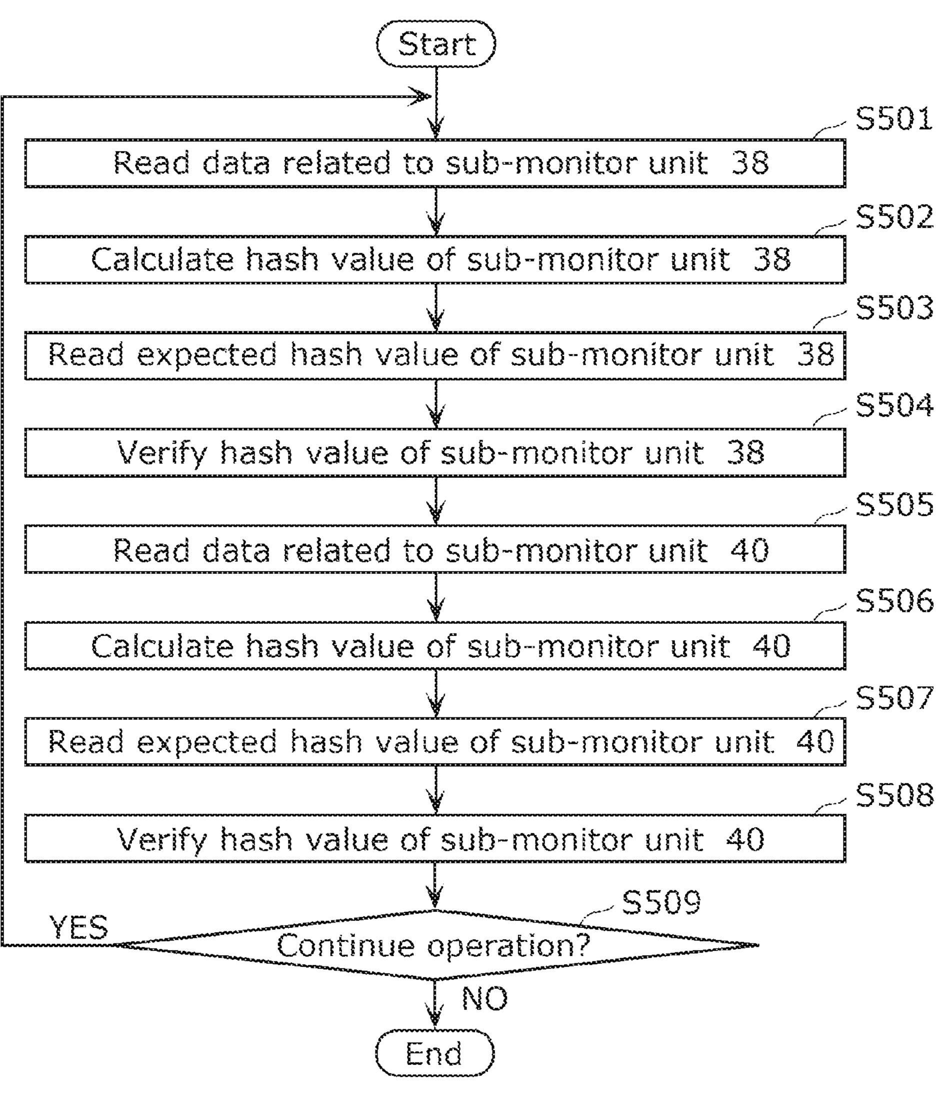
FIG. 9 is a flowchart illustrating the flow of operation of a first monitor unit according to Embodiment 2.

Next, the operation of first monitor unit 22A according to Embodiment 2 will be described with reference to FIG. 9. FIG. 9 is a flowchart illustrating the flow of operation of first monitor unit 22A according to Embodiment 2.

First, when information processing device 2A starts operating, various programs of information processing device 2A are started (activated). As illustrated in FIG. 9, reader 26A in first monitor unit 22A reads data related to sub-monitor unit 38 from storage 44 in sub-monitor unit 38 after sub-monitor unit 38 is activated (S501). Following this, controller 30A in first monitor unit 22A calculates a hash value of sub-monitor unit 38 based on the data related to sub-monitor unit 38 read by reader 26A (S502).

Controller 30A then reads the expected hash value "AAA" of sub-monitor unit 38 from storage 28A (S503). Controller 30A then verifies the hash value of sub-monitor unit 38 by comparing the calculated hash value of sub-monitor unit 38 with the expected hash value "AAA" of sub-monitor unit 38 read from storage 28A (S504). In detail, controller 30A executes constant integrity verification for sub-monitor unit 38 by verifying whether the hash value of sub-monitor unit 38 matches the expected hash value "AAA".

After Step S504, reader 26A reads data related to sub-monitor unit 40 from storage 50 in sub-monitor unit 40 after sub-monitor unit 40 is activated (S505). Following this, controller 30A calculates a hash value of sub-monitor unit 40 based on the data related to sub-monitor unit 40 read by reader 26A (S506).

Controller 30A then reads the expected hash value "BBB" of sub-monitor unit 40 from storage 28A (S507). Controller 30A then verifies the hash value of sub-monitor unit 40 by comparing the calculated hash value of sub-monitor unit 40 with the expected hash value "BBB" of sub-monitor unit 40 read from storage 28A (S508). In detail, controller 30A executes constant integrity verification for sub-monitor unit 40 by verifying whether the hash value of sub-monitor unit 40 matches the expected hash value "BBB".

After Step S508, in the case of continuing the operation of information processing device 2A (S509: YES), the process returns to Step S501. In the case of stopping the operation of information processing device 2A (S509: NO), the flowchart in FIG. 9 ends.

The operation of second monitor unit 24 is the same as that in Embodiment 1, and accordingly its description will be omitted.

[2-3. Effects]

In this embodiment, constant integrity verification processing is distributed between the plurality of sub-monitor units 38 and 40 and first monitor unit 22A, so that constant integrity verification can be executed efficiently.

Moreover, the frequency of executing constant integrity verification can be set as appropriate for each of the plurality of sub-monitor units 38 and 40 depending on various conditions. Specifically, for example, in the case where monitored unit 16 operates on application 10 (see FIG. 1) that is susceptible to external attacks, sub-monitor unit 38 executes constant integrity verification for monitored unit 16 at a relatively high frequency (for example, once every second). For example, in the case where each of monitored units 18 and 20 operates on operating system 8 (see FIG. 1) that is not susceptible to external attacks, sub-monitor unit 40 executes constant integrity verification for each of monitored units 18 and 20 at a relatively low frequency (for example, once every 10 seconds).

(Other Variations)

While an information processing device and a control method for an information processing device according to one or more aspects have been described above by way of embodiments, the present disclosure is not limited to the foregoing embodiments. Other modifications obtained by applying various changes conceivable by a person skilled in the art to the foregoing embodiments and any combinations of the structural elements in different embodiments without departing from the scope of the present disclosure are also included in the scope of one or more aspects.

Although controller 30 in first monitor unit 22 verifies all of the plurality of monitored units 16, 18, and 20 in Embodiment 1, the present disclosure is not limited to such. For example, controller 30 in first monitor unit 22 may determine a monitored unit higher in priority among the plurality of monitored units 16, 18, and 20, to be verified. This can speed up constant integrity verification.

Although controller 30A in first monitor unit 22A verifies all of the plurality of sub-monitor units 38 and 40 in Embodiment 2, the present disclosure is not limited to such. For example, controller 30A in first monitor unit 22A may determine a sub-monitor unit higher in priority among the plurality of sub-monitor units 38 and 40, to be verified.

Although controller 30 in first monitor unit 22 calculates, for example, the hash value of monitored unit 16 based on the data related to monitored unit 16 in Embodiment 1, the present disclosure is not limited to such, and controller 30 may calculate the hash value of monitored unit 16 based on only part of the data related to monitored unit 16. The same applies when controllers 30A, 36, 46, and 52 calculate hash values.

Each of the structural elements in each of the foregoing embodiments may be configured in the form of an exclusive hardware product, or may be implemented by executing a computer program suitable for the structural element. Each of the structural elements may be implemented by means of a program executing unit, such as a CPU and a processor, reading and executing the computer program recorded on a recording medium such as a hard disk or semiconductor memory.

Part or all of the functions of information processing devices 2 (2A) according to each of the foregoing embodiments may be implemented by a processor such as a CPU executing a computer program.

Part or all of the structural elements constituting each device may be configured as an IC card detachably mountable to the device or a standalone module. The IC card or the module is a computer system including a microprocessor, ROM, RAM, and so forth. The IC card or the module may include super-multifunctional LSI. The IC card or the module achieves its functions by the microprocessor operating according to a computer program. The IC card or the module may be tamper-resistant.

The present disclosure may be implemented as the method described above. The present disclosure may be a computer program which implements the method by a computer, or may be digital signals including the computer program. The present disclosure may be the computer program or the digital signals recorded in a non-transitory computer-readable recording medium, such as flexible disk, hard disk, CD-ROM, MO, DVD, DVD-ROM, DVD-RAM, Blu-ray (registered trademark) disc (BD), or semiconductor memory. The present disclosure may also be the digital signals recorded in such a recording medium. The present disclosure may be the computer program or the digital signals transmitted over a network such as an electric communication line, a wireless or wired communication line, or the Internet, data broadcasting, or the like. The present disclosure may be a computer system including a microprocessor and memory, where the memory stores the computer program and the microprocessor operates according to the computer program. The present disclosure may also be carried out by another independent computer system, by the computer program or the digital signals being recorded in the recording medium and transferred, or by the computer program or the digital signals being transferred over the network or the like.

Further Information about Technical Background to this Application

The disclosures of the following patent applications including specification, drawings, and claims are incorporated herein by reference in their entirety: Japanese Patent Application No. 2022-146517 filed on Sep. 14, 2022, and PCT International Application No. PCT/JP2023/003978 filed on Feb. 7, 2023.

INDUSTRIAL APPLICABILITY

The present disclosure is applicable to, for example, an information processing device for executing constant integrity verification for various programs in an in-vehicle network.

The invention claimed is:

1. An information processing device comprising:

a plurality of first monitored units included in a non-secure region of the information processing device;

one or more first monitor units that monitors the plurality of first monitored units, and repeatedly verifies the plurality of first monitored units by comparing a hash value of the plurality of first monitored units with a first expected hash value that is an expected value of the hash value of the plurality of first monitored units, wherein the one or more first monitor units are included in the non-secure region of the information processing device; and a second monitor unit that is included in a secure region of the information processing device, monitors the one or more first monitor units, and repeatedly verifies the one or more first monitor units by comparing a hash value of the one or more first monitor units with a second expected hash value that is an expected value of the hash value of the one or more first monitor units, the hash value of the one or more first monitor units including the first expected hash value, wherein each of the one or more first monitor units includes:

a first storage that stores the first expected hash value; and a first controller that repeatedly verifies the plurality of first monitored unit by calculating the hash value of the plurality of first monitored units and comparing the hash value calculated with the first expected hash value stored in the first storage, the second monitor unit includes:

a second storage that stores the second expected hash value; and a second controller that repeatedly verifies the one or more first monitor units by calculating the hash value of the one or more first monitor units and comparing the hash value calculated with the second expected hash value stored in the second storage, a number of the plurality of first monitored units is greater than a number of the one or more first monitor units, and the second monitor unit monitors the one or more first monitor units, the number of which is less than the number of the plurality of first monitored units.

2. The information processing device according to claim 1, further comprising:

a plurality of second monitored units, wherein the plurality of first monitored units includes:

a third storage that stores a third expected hash value that is an expected value of a hash value of the plurality of second monitored units; and a third controller that repeatedly verifies the plurality of second monitored units by calculating the hash value of the plurality of second monitored units and comparing the hash value calculated with the third expected hash value stored in the third storage, whether a number of the plurality of second monitored units is greater than the number of the plurality of first monitored units.

3. The information processing device according to claim 1, the first controller determines, as a first monitored unit to be verified, a first monitored unit higher in priority among the plurality of first monitored units.

4. The information processing device according to claim 2, whether the number of the plurality of second monitored units is at least three, and the number of the plurality of first monitored units is two.

5. The information processing device according to claim 1, whether the number of the plurality of first monitored units is at least two, and the number of the one or more first monitor units is one.

6. A control method for an information processing device that includes: a plurality of monitored units included in a non-secure region of the information processing device; one or more first monitor units that monitor the plurality of monitored units, wherein the one or more first monitor units are included in the non-secure region of the information processing device; and a second monitor unit that is included in a secure region of the information processing device and monitors the one or more first monitor units, the control method comprising:

repeatedly verifying, by the one or more first monitor unit, the plurality of monitored units by comparing a hash value of the plurality of monitored units with a first expected hash value that is an expected value of the hash value of the plurality of monitored units; and repeatedly verifying, by the second monitor unit, the one or more first monitor units by comparing a hash value of the one or more first monitor units with a second expected hash value that is an expected value of the hash value of the one or more first monitor units, the hash value of the one or more first monitor units including the first expected hash value, wherein a number of the plurality of monitored units is greater than a number of the one or more first monitor units, and the second monitor unit monitors the one or more first monitor units, the number of which is less than the number of the plurality of monitored units.

* * * * *